_United States Patent_ [19]

Schroeder

[11] 4,400,863

[45] Aug. 30, 1983

[54] METHOD OF MAKING A RIGID FIBERGLASS DUCT HAVING AN INTEGRAL BENDABLE ELBOW

[75] Inventor: Clifford A. Schroeder, Westlake Village, Calif.

[73] Assignee: C.A. Schroeder, Inc., San Fernando, Calif.

[21] Appl. No.: 317,194

[22] Filed: Nov. 2, 1981

[51] Int. Cl.³ .................. B23P 11/02; B31C 13/00
[52] U.S. Cl. .................. 29/450; 29/455 R; 29/458; 29/460; 29/469.5; 138/120; 138/121; 156/187
[58] Field of Search .............. 29/469.5, 157 R, 458, 29/460, 455 R, 450; 138/120, 121, 139; 156/187, 188, 191, 257, 261

[56] References Cited

U.S. PATENT DOCUMENTS

| | | | |
|---|---|---|---|
| 1,798,305 | 3/1931 | Christophersen | 156/191 X |
| 2,837,456 | 6/1958 | Parillo | 156/191 X |
| 2,878,038 | 3/1959 | Noland | 156/187 X |
| 3,363,301 | 1/1968 | Delaruelle et al. | 29/469.5 X |
| 3,605,232 | 9/1971 | Hines | 29/460 UX |
| 4,003,122 | 1/1977 | Overmyer et al. | 29/450 X |
| 4,187,135 | 2/1980 | Yates et al. | 156/188 X |
| 4,211,589 | 7/1980 | Fisher et al. | 156/187 X |
| 4,236,386 | 12/1980 | Yates et al. | 156/187 X |
| 4,265,951 | 5/1981 | Yates et al. | 156/188 X |
| 4,289,557 | 9/1981 | Stanwood et al. | 156/187 X |

FOREIGN PATENT DOCUMENTS

| | | | |
|---|---|---|---|
| 543949 | 9/1959 | Belgium | 156/188 |
| 1083399 | 9/1967 | United Kingdom | 138/139 |

_Primary Examiner_—Charlie T. Moon
_Attorney, Agent, or Firm_—David O'Reilly

[57] ABSTRACT

A rigid, molded fiberglass duct having an integral bendable elbow comprised of two sections of cured fiberglass securely bonded to a corrugated metal-foil sleeve. The method of manufacturing the rigid bendable duct is by sliding a corrugated metal-foil sleeve on to a mandrel and then wrapping the ends of the sleeve with uncured fiberglass. The area of the uncured fiberglass overlapping the corrugated, bendable sleeve is compacted by means of a collar which fits around the sleeve and the fiberglass and compresses the fiberglass into the corrugations of the sleeve. In order to enhance the bond, protusions may be provided in the overlapping area of the sleeve, such as by cutting the corrugated sleeve and bending it up to form tabs.

15 Claims, 4 Drawing Figures

METHOD OF MAKING A RIGID FIBERGLASS DUCT HAVING AN INTEGRAL BENDABLE ELBOW

BACKGROUND

This invention relates to rigid fiberglass ducts and more particularly relates to a method of making a rigid fiberglass duct having an integral bendable elbow.

Rigid fiberglass air ducts have been around for years and are constructed by wrapping uncured fiberglass around a mandrel to a specific thickness. The fiberglass wrapped mandrel is then surrounded by a cavity and baked at temperatures of approximately 400-500 degrees for a few minutes. This cures the resin-impregnated fiberglass forming a rigid tubular fiberglass air duct.

Generally, when a bend is encountered, an elbow is inserted between two ducts and secured by means of duct tape. However, this method is unsatisfactory as over a long period of use the duct tape can lose its adhesiveness and the duct separate from the elbow. This is a constantly recurring problem and the only solution presently available is to rewind the separated area of the fiberglass duct with duct tape. The separations usually occur because of the porosity of the rigid fiberglass duct, which allows the duct tape to dry out and peel off. It would be advantageous if an integral bendable elbow could be built into a section of fiberglass duct, thus, providing an effective solution to accommodating bends when installing the fiberglass ducts.

SUMMARY

The purpose of the present invention is to provide a rigid fiberglass air duct having an integrally formed bendable elbow.

In the method of the present invention, a metal-foil corrugated sleeve is secured to a pair of sections of rigid duct to form the duct having the integral bendable elbow. The flexible, corrugated, metal-foil sleeve is first slipped onto a mandrel and centered. Uncured fiberglass is then wrapped around the mandrel and an overlapping portion of the ends of the sleeve a predetermined amount. The uncured fiberglass is impregnated with uncured resin. A collar having bell-shaped ends is then placed around the sleeve and the overlapping portions of fiberglass and securely clamped to compress and compact the fiberglass into the corrugations of the sleeve. The mandrel, fiberglass and sleeve are then enclosed in a cavity and heated approximately 400-500 degrees for sufficient time (usually only a few minutes) to cure the resin, rigidify the duct and bond the overlapping portion of the fiberglass to the corrugated sleeve.

In order to enhance the bond, protuberances of some type maybe formed in the sleeve in the area where the fiberglass overlaps. These protuberances can be in the form of bumps on the metal-foil, in the corrugations themselves or can be hooks formed by cutting the corrugated flexible metal sleeve at intervals and bending the ends up to form tabs, which become embedded into the compacted fiberglass to "hook-on" to the cured fiberglass duct.

To complete the assembled duct, duct wrap insulation is wound or wrapped around the exposed area of the sleeve and extends over the overlapping portion of the fiberglass. A flexible sleeve or jacket which maybe a plastic such as polyethylene vinyl or other suitable flexible material, is slipped over the entire assembly with a sufficient length of flexible material provided to allow the elbow to easily bend.

Preferably the flexible or bendable elbow is an aluminum foil sleeve referred to generally as Aluminum Flex, which can be provided in various lengths. The metal-foil sleeve is sufficiently stiff to preserve its tubular shape when bent. Generally, it would be most desirable to provide the sleeve in lengths which would permit a 90 degree bend easily.

It is one object of the present invention to provide a rigid duct having an integral bendable elbow.

Another object of the present invention is to provide a rigid duct having a metal-foil sleeve securely bonded to sections of cured, rigid fiberglass.

Still another object of the present invention is to provide a rigid duct having cured, rigid, fiberglass sections securely bonded to a metal-foil corrugated sleeve which includes protuberances to enhance the bond.

These and other objects will become apparent from the following detailed description of the invention when considered in conjunction with the accompanying drawings wherein like reference numbers identify like parts.

DESCRIPTION OF THE PREFERRED EMBODIMENT

Figure 1:
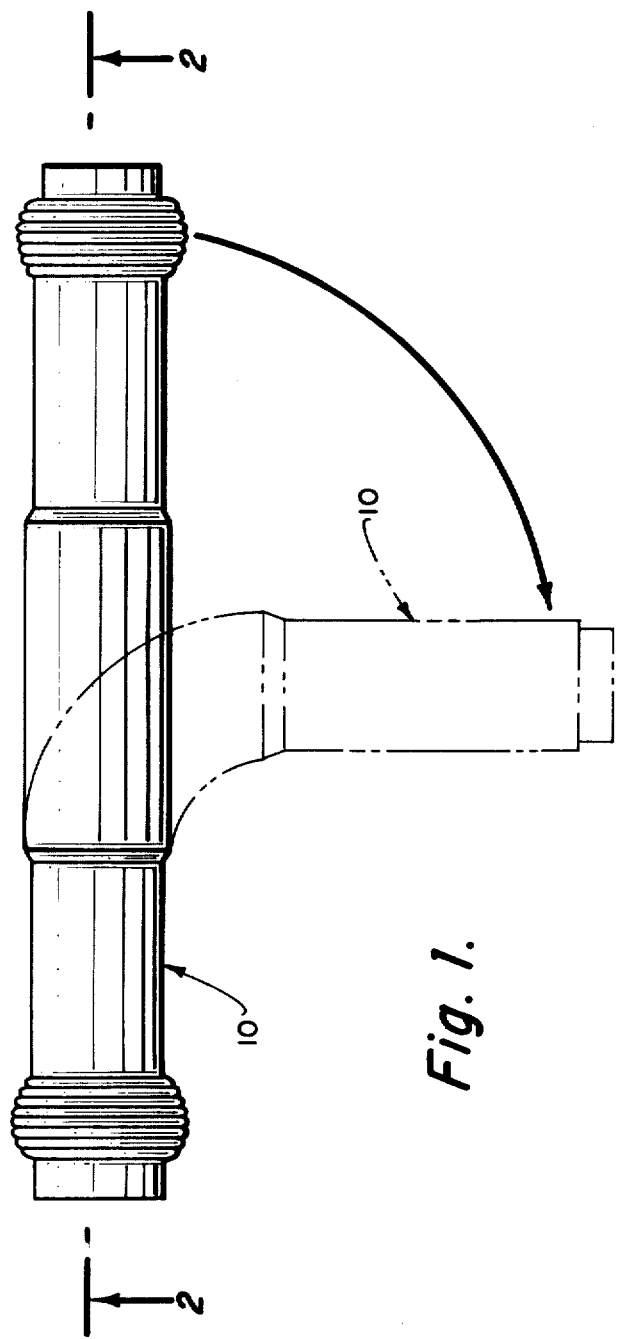
FIG. 1 is a side elevation of a duct made according to the invention illustrating its operation.
Figure 2:
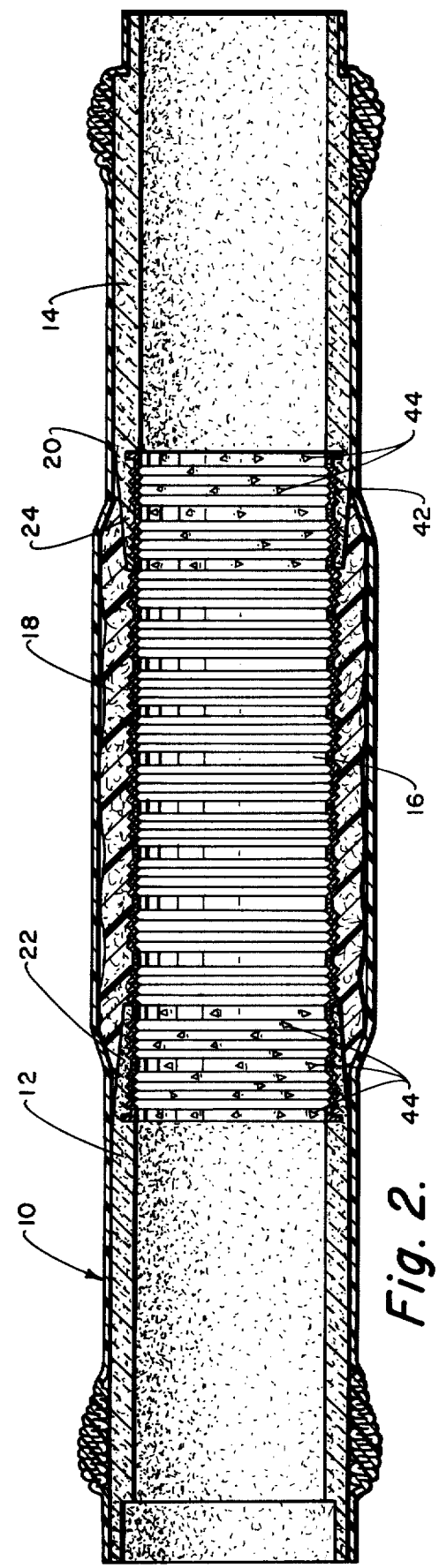
FIG. 2 is a sectional view taken at 2—2 of FIG. 1.

The rigid, molded, fiberglass air duct having the integral, bendable sleeve is generally indicated at 10 in FIGS. 1 and 2. The duct is comprised of rigid fiberglass sections 12 and 14 securely bonded to a flexible or bendable sleeve 16 so it can bend as indicated in phantom in FIG. 1. The complete duct has the center portion of the flexible sleeve 16 covered with suitable insulation such as duct wrap 18 over which a flexible jacket or sleeve 20 is slid to cover the entire structure. The molded, rigid, fiberglass sections 12 and 14 are securely bonded to the flexible section 16 at 22 and 24 as will be described in greater detail hereinafter.

The flexible section 16 is generally a metal-foil corrugated section sometimes called Aluminum Flex. These flexible sections are comprised of aluminum foil wrapped to provide a corrugated stiff tube which will preserve its shape when bent. The overlapping area of the rigid fiberglass ducts 12 and 14 indicated at 22 and 24 are securely bonded to the ends of the flexible section 16 so that an integral unitary construction is provided.

Figure 3:
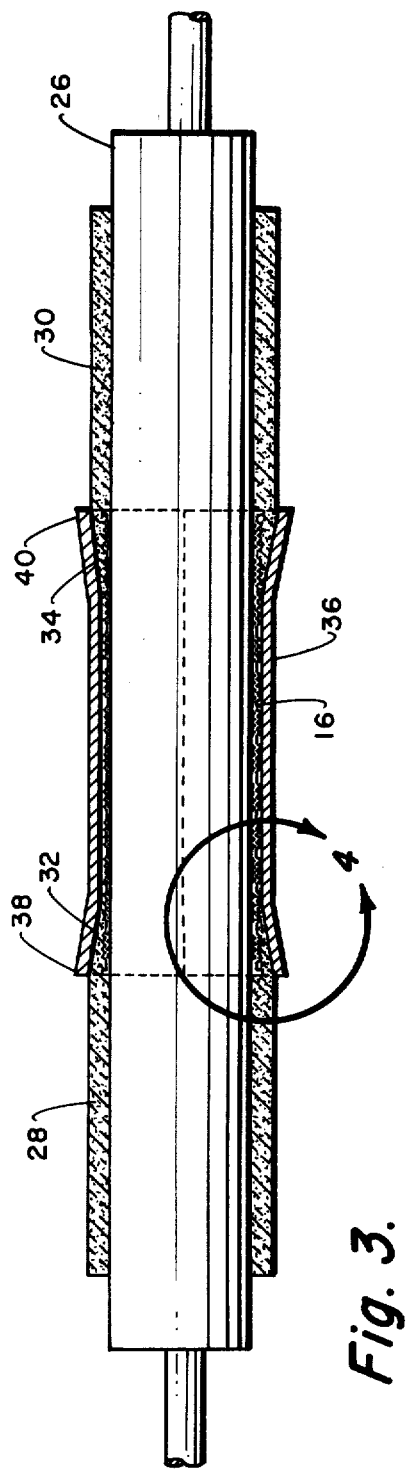
FIG. 3 is a sectional view illustrating the method of manufacturing the invention.

The method of constructing the device is illustrated in FIG. 3. The corrugated, metal-foil, Aluminum Flex section 16 is first slid onto a mandrel 26 to provide support. The mandrel 26 is then wrapped with fiberglass impregnated with uncured resin as indicated at 28 and 30 overlapping portions 32 and 34 of the flexible section 16. In order to enhance the bond of the fiberglass to the flexible section 16 in the areas indicated at 32 and 34 a collar 36 having bell-shaped end sections 38 and 40 is placed around the entire structure and securely clamped by any suitable means. The collar maybe clamped by any suitable method such as a wedge or bolt and eye construction, is desired. The bell-shaped sections 38 and 40 are approximately equal to the length of the overlapping portions 32 and 34 of the aluminum flexible section 16. The collar 36 clamps the fiberglass sufficiently to provide an increase in density of at least twice that of the uncompacted fiberglass.

The mandrel with the fiberglass wrapping and aluminum section is then cured in a cavity by heating to a temperature of 400–500 degrees for a period of a few minutes. The uncured fiberglass being compacted and compressed into the corrugations of the flexible section as shown at 42 of FIG. 2 will form tapered ends 28 and 30 of the rigid fiberglass duct securely bonded to the aluminum section. In order to enhance the bonding of the fiberglass to the aluminum flexible duct bumps, tabs or protrusions 44 maybe provided in the aluminum flexible section before it is installed on the mandrel 26. One method could be by dimpling the metal-foil section in the area of the corrugations as shown.

Figure 4:
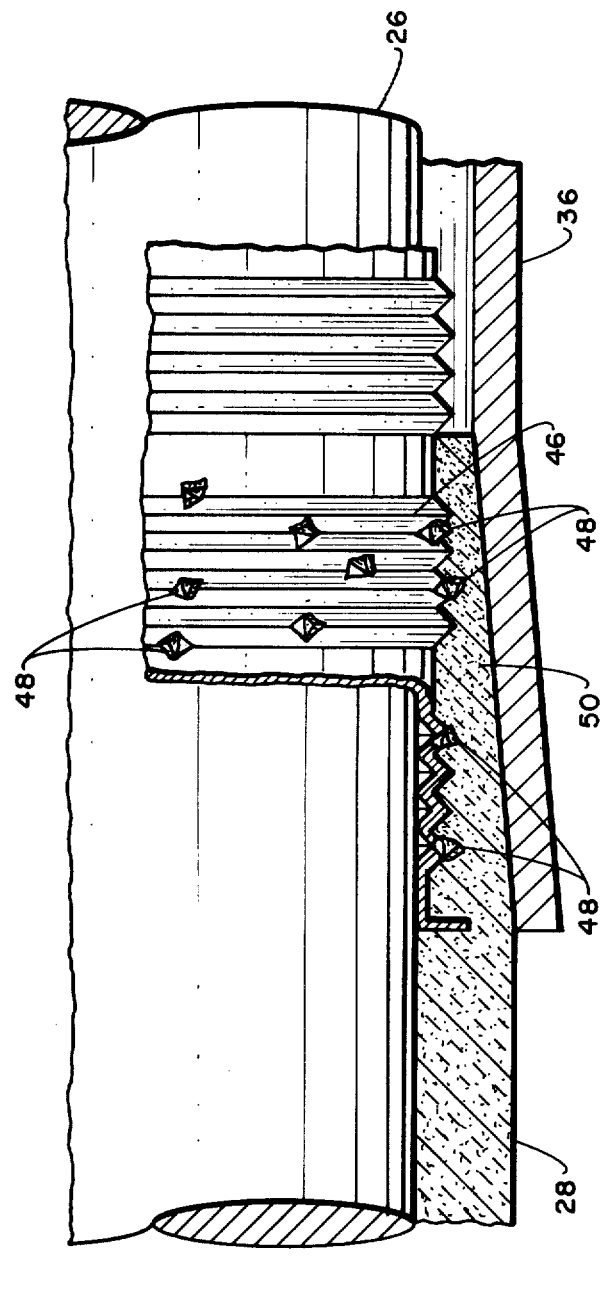
FIG. 4 is a detailed view illustrating a method of enhancing the bond of fiberglass to the flexible sleeve.

An alternate method of enhancing the bond of fiberglass to the metal section is illustrated in FIG. 4. In this section the area adjacent the overlapping fiberglass and aluminum duct is illustrated. The aluminum duct 16 has a plurality of ridges 46 spiralling around the flexible section. By cutting these ridges 46 and bending them up at selected intervals as illustrated at 48 hooks or tabs maybe provided which become imbedded in the tapered, highly compressed and compacted area 50 of the fiberglass enhancing the bond of the aluminum flexible section to the rigid fiberglass duct.

The assembly of the duct to the integral, bendable section is completed with a wrap of loosely wound fiberglass insulation sometimes referred to as duct wrap 18 as illustrated in FIG. 2 and the entire assembly covered with a flexible jacket 20. The sleeve wil be sufficiently long to be bunched at the ends or middle to provide sufficient length or expand to permit up to a 90 degree bend as illustrated in FIG. 1. The length of the flexible section 16 will be selected to provide bends up to the 90 degree bend as shown.

Obviously, many modifications and variations of the invention are possible in light of the above teachings. It is therefore to be understood that the full scope of the invention is not limited to the details disclosed herein, but only by the appended claims and maybe practiced as specifically described.

What is claimed is:

1. A method of making a rigid fiberglass duct having an integral bendable elbow comprising:
   positioning a bendable elbow on a mandrel;
   wrapping the mandrel and adjacent ends of said elbow with uncured fiberglass;
   said uncured fiberglass overlapping only the ends of said bendable elbow;
   compressing the overlapping portions of the uncured fiberglass;
   heating the assembled fiberglass and bendable elbow to cure and compact the fiberglass until substantially rigid whereby the fiberglass becomes bonded to the bendable elbow.

2. The method according to claim 1 in which said bendable elbow is a bendable corrugated metal-foil elbow.

3. The method according to claim 2 including;
   treating the bendable elbow to enhance the bond.

4. The method according to claim 3 in which said step of treating the bendable elbow comprises dimpling the metal-foil corrugated elbow in the area of overlapping ends.

5. The method according to claim 3 in which said step of treating the elbow comprises cutting the ridges of the corrugated metal-foil elbow and bending them up to form tabs.

6. The method according to claim 2 in which the step of compressing the fiberglass comprises;
   securing a collar around the bendable elbow and overlapping portion of fiberglass;
   tightening said collar to compress the overlapping fiberglass into the corrugations.

7. The method according to claim 6 in which said collar increases the density of the fiberglass at least two times.

8. The method according to claim 6 in which said collar is adapted to compact the overlapping fiberglass tapering inward toward the center.

9. The method according to claim 4 in which the step of compressing the fiberglass comprises;
   securing a collar around the bendable elbow and overlapping portion of fiberglass;
   tightening said collar to compress the overlapping fiberglass into the corrugations.

10. The method according to claim 9 in which said collar increases the density of the fiberglass at least two times.

11. The method according to claim 9 in which said collar is adapted to compact the overlapping fiberglass tapering inward toward the center.

12. The method according to claim 5 in which the step of compressing the fiberglass comprises;
    securing a collar around the bendable elbow and overlapping portion of fiberglass;
    tightening said collar to compress the overlapping fiberglass into the corrugations.

13. The method according to claim 12 in which said collar increases the density of the fiberglass at least two times.

14. The method according to claim 12 in which said collar is adapted to compact the overlapping fiberglass tapering inward toward the center.

15. The method according to claim 14;
    including wrapping the exposed portion of the bendable elbow and the tapered portion of the compacted fiberglass with insulation;
    covering the entire duct with flexible tubular jacket.

* * * * *